Oct. 29, 1963   R. J. SHORT ETAL   3,108,853
METHOD OF MAKING REINFORCED PLASTIC DIE BOXES
Filed March 9, 1961   2 Sheets-Sheet 1
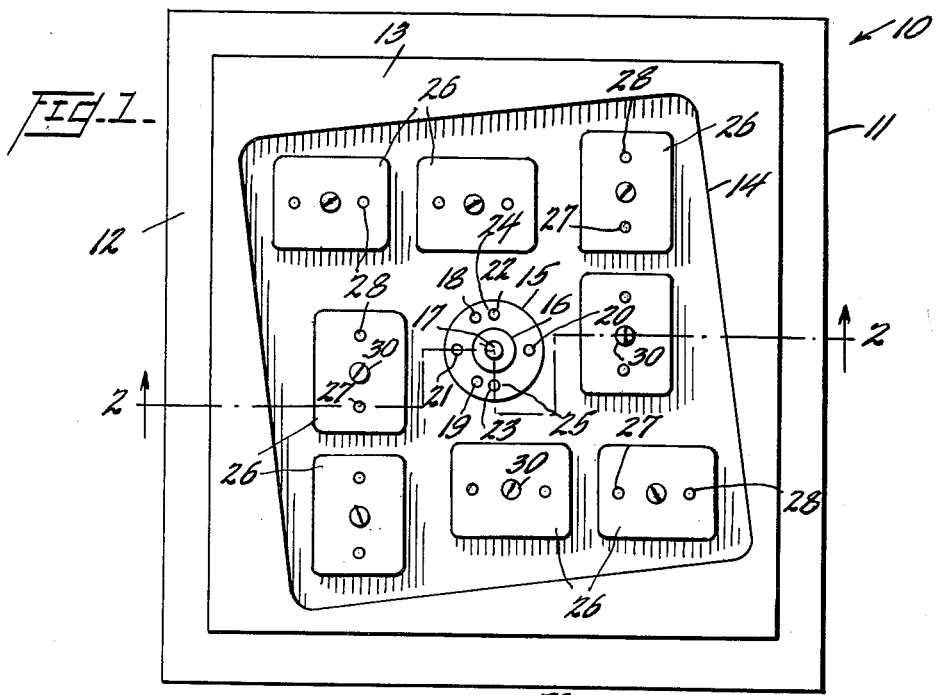
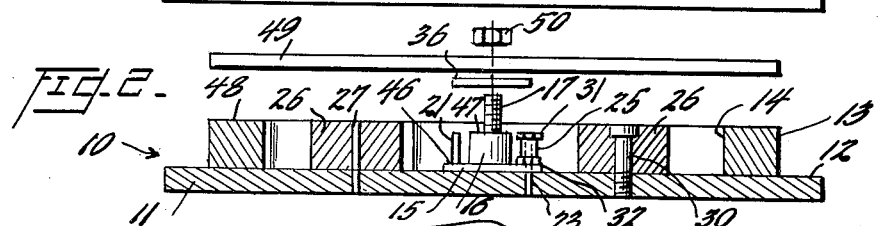
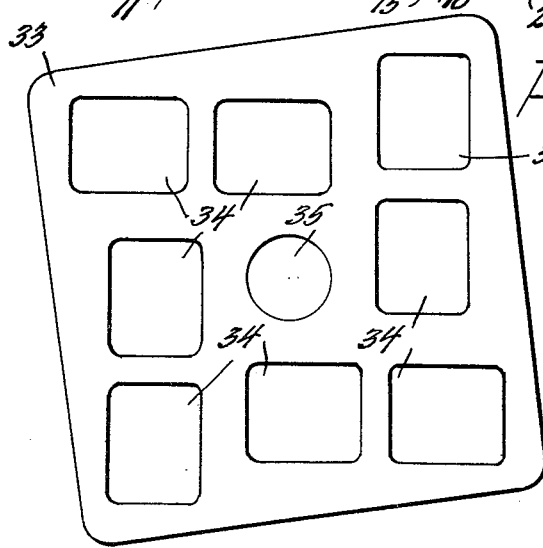
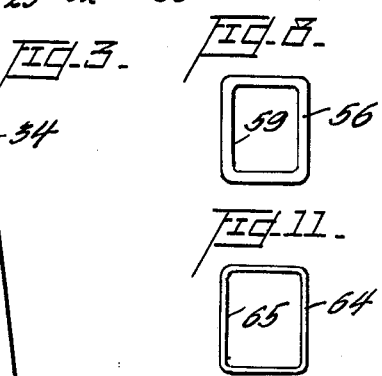
INVENTORS
Robert J. Short
Gilbert P. Hammond
Donald E. Joyce
BY
Fredrick H. Braun ATTORNEY

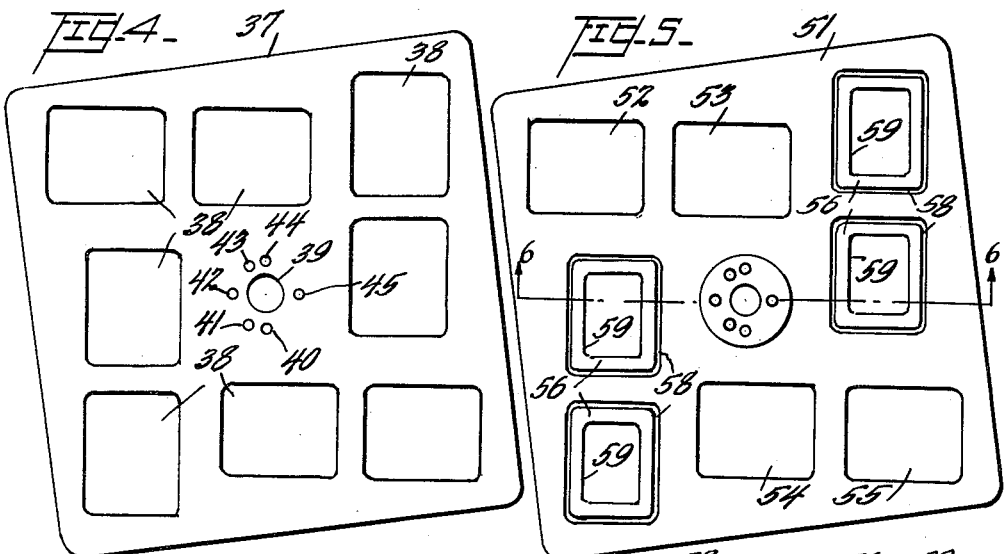

United States Patent Office 3,108,853
Patented Oct. 29, 1963

3,108,853
METHOD OF MAKING REINFORCED
PLASTIC DIE BOXES
Robert J. Short and Gilbert P. Hammond, Wyoming, and Donald E. Joyce, Cincinnati, Ohio, assignors to The Procter & Gamble Company, Cincinnati, Ohio, a corporation of Ohio
Filed Mar. 9, 1961, Ser. No. 94,633
5 Claims. (Cl. 18—59)

This invention relates to a new and useful method of making a reinforced plastic die box which forms one part of a die set used on a stamping machine for pressing soap and detergent materials into the form of bars or cakes.

Soap and detergent bars are conventionally pressed from a crude plastic cake into their final shape by an automatic soap stamping apparatus. In a typical soap stamp, a die box or rotary carrier member is formed with a plurality of lateral openings therethrough. The openings are usually disposed singly, in pairs or in groups of three at right angles to each other with respect to the axis of rotation and along each side of the substantially square die box or rotary carrier. The die boxes move intermittently in 90° increments so that the mold openings in the die box are successively loaded at a first station, pressed into finished shape by a pair of opposed pressing dies at a second station and then discharged at a third station. A typical press of this character is described in U.S. Patent 1,796,253, issued on March 10, 1931, to Ruel A. Jones.

Until recent years, the rotary carrier member or die box has been fabricated from metals and alloys, e.g. bronze, stainless steel, aluminum, Monel metal or other metals which are resistant to chemical attack from soap and detergent bar compositions. Metal die boxes of this nature are expensive because of the cost of the material itself, the cost of machining it and the need for painstaking and time consuming hand-fitting of the periphery of the pressing dies to conform perfectly with each of the mold openings in the die box. The close metal-to-metal fit of the pressing dies in the mold openings of a metal die box, causes a relatively high rate of wear and, in some cases, galling which further increases operating and maintenance costs. Metal die boxes are extremely heavy and this results in greater wear on the parts and mechanism used in supporting, rotating and indexing the die box.

One of the major objects of this invention is the provision of a method for contact molding a reinforced plastic die box with plastic inserts in the die openings in order to provide a light, strong, corrosion resistant, dimensionally stable and inexpensive die box for a soap stamp.

One object of this invention is the provision of a method of making a reinforced plastic die box which is inexpensive to maintain and repair.

Another object of this invention is the provision of a method for making a reinforced plastic die box so that hand-fitting of the pressing dies to the mold openings in the die box is eliminated whereby the direct labor cost is substantially reduced and the downtime of the soap stamp for replacing die boxes is decreased to a great extent.

Still another object of this invention is the provision of a method for producing a reinforced plastic die box having plastic inserts which is substantially lighter than conventional metal die boxes thereby reducing the load and the wear on the indexing mechanism of the soap stamp.

A further object of this invention is a method of producing a reinforced plastic die box in which the worn plastic inserts can be individually replaced.

A still further object of this invention is a method of producing a die box of reinforced plastic with plastic inserts in order to reduce the wear on the pressing dies, and eliminate contamination of soap and detergent bars which might result from metallic particles flaking off the openings of a metal die box.

Yet another object of this invention is a method of fabricating a reinforced plastic die box with plastic inserts which greatly improve the surface quality of the finished detergent and soap bars made on the soap stamp.

Still a further object of the invention is the provision of a method for making a finished die box from reinforced plastic materials by a contact molding procedure which produces the finished die box and does not require additional machining for screw and locating pin holes, the central mounting hole and counterbore which mates with the hub of the soap stamp.

Briefly stated, in accordance with one aspect of the invention, a reinforced plastic die box is fabricated by forming a die box frame using the contact molding process within a suitable mold by placing a plurality of layers of glass fiber members in the mold and applying a plastic binder material to the glass fiber thereby forming a die box frame having suitable openings for receiving the inserts. The finished frame is removed from the mold after the plastic binder material has been cured. A plastic insert is then placed in each insert opening of the die box frame and positioned so that it can be molded to the frame by casting a plastic binder material in the gap between the insert and the openings in the frame which upon curing, secures the inserts to the frame. The inner opening of the inserts is slightly smaller than the outside dimensions of the pressing dies. The finish cut in the insert openings is accomplished by mounting the die box frame on the soap stamp and then moving a pair of opposed pressing dies into the opening of each insert so that a perfect fit is achieved as a result of the broaching action of the pressing dies in the plastic insert openings.

While the specification concludes with claims particularly pointing out and distinctly claiming the subject matter regarded as constituting the present invention, it is believed the invention will be better understood from the following description taken in connection with the accompanying drawings in which:

FIGURE 1 is a plan view of a mold for fabricating the die box frame; and

FIGURE 2 is an elevation of the mold taken in cross section along the line 2—2 of FIGURE 1; and FIGURE 3 is a plan view of a precut glass fiber member used for laminating the outer portions of the die box frame; and FIGURE 4 is a plan view of a precut glass fiber member used for laminating the inner portion of the die box frame; and FIGURE 5 is a plan view of the finished die box frame in which two pairs of openings have inserts molded therein; and FIGURE 6 is an elevation in cross section taken along the line 6—6 of FIGURE 5; and FIGURE 7 is an isometric view of the plastic inserts used in the die box; and FIGURE 8 is a plan view of the plastic insert of FIGURE 7; and FIGURE 9 is a fragmentary elevation, partially in cross section, showing the pressing dies broaching the opening of two inserts; and FIGURE 10 is a plan view of a jig for positioning and molding the inserts into the die box frame; and FIGURE 11 is a plan view of a plastic insert that can be used in an alternate method of fabricating the die box.

Referring now to the drawings, FIGURES 1 and 2 illustrate a mold 10 which can be used for molding the reinforced plastic die box frame by the contact molding process. The mold 10 is composed of a baseplate 11 which is substantially flat and has a relatively smooth surface 12. The baseplate 11 should be made from metallic material such as steel, brass or the like. A frame 13 is secured to the base plate 11 by any well known fastening means. The inner contour 14 of the frame 13 defines the outer periphery of the mold and/or die box. A circular member 15 is secured to the baseplate 11 substantially in the center of the frame 13 and provides a counterbore in the die box after it has been molded. A cylindrical projection 16 extends upwardly from the circular member 15 and terminates in a threaded end 17. The upwardly projecting pins 18, 19, 20 and 21 are secured to the circular member 15 and baseplate 11. The pins 18, 19 and 20 form clearance holes for the studs that are used to secure the finished die box to the hub of the soap stamp. The pin 21 forms a locating dowel hole.

Pins 22 and 23 are also secured to the circular member 15 and baseplate 11. They are used to position internally threaded jacking screw inserts 24 and 25. Of course, the minor diameter of the threads in the inserts 24 and 25 is slightly greater than the outer diameter of the pins 22 and 23.

A plurality of blocks 26 which can be made from wood or other material are used to form insert openings in the die box frame. Each block 26 is positioned by a pair of dowels 27 and 28 which engage suitably positioned locating holes 29 in the baseplate 11. A screw 30 is used to secure each of the blocks 26. It will be noted that the blocks 26 are arranged in four pairs substantially at right angles to one another in order to form insert openings for a "duplex" soap stamp. Of course, when making a die box frame for a "simplex" stamp, a mold having four blocks arranged at right angles would be used; and in forming a die box frame for a "triplex" stamp, twelve blocks would be used, arranged in groups of three with the groups arranged substantially at right angles to one another.

In fabricating the die box frame, the mold 10 is first assembled as shown in FIGURES 1 and 2 and the internally threaded jacking screw inserts 24 and 25 are placed over the pins 22 and 23. It will be noted that the ends 31 and 32 of the inserts 24 and 25 are in the form of a hexagon in order that they will not turn once embedded in the renforced plastic when, for example, they are used to remove the die box frame from the hub of the soap stamp.

The precut glass fiber material to be placed within the mold is shown in FIGURES 3 and 4. The glass fiber member 33 in FIGURE 3 has an outer contour which conforms substantially to the inner contour 14 of the frame 13. The openings 34 fit around the blocks 26 and the opening 35 fits over the cylindrical member 15 and the washer 36 (see FIGURE 2). The glass fiber member 37 has substantially the same outer contour as the member 33 and its openings 38 correspond to the openings 34. A central opening 39 in the member 37 fits over the projection 16 and the small openings 40, 41, 42, 43, 44 and 45 fit over the pins 18, 19, 20 and 21 and the jacking screws 24 and 25. The members 33 and 37 can be made from any of several different types of glass fiber material. For example, they can be plain or square weave cloth, roving or random fiber mats. Regardless of their form, however, they are precut to fit the mold. A plain weave cloth having a weight of about ten ounces per square yard is preferred although other weights and forms can be used to attain substantially similar results.

The plastic binder material used is preferably a liquid epoxy resin to which a hardening agent has been added. An example of several hardening agents that can be used are polyamines, polysulfides or polyamides which are generally used when room temperature cures are desired. Good results have been achieved with an aliphatic polyamine hardening agent. Other liquid plastic molding compounds such as polyester, phenolic, melamine and polystyrene resins, each mixed with a hardening agent, if needed, to give a room temperature cure, can be used to achieve substantially similar results although the liquid epoxy resin is preferred because of its dimensional stability and minimal shrinkage.

After the mold has been assembled, the molding of the die box frame may be started. The first step is to apply a coating of a suitable parting agent to all the mold surfaces which will be contacted by the plastic in order to prevent the plastic from adhering to the mold. A parting agent having the necessary properties can be selected from the group consisting of waxes, silicones, polyethylene and other materials which will function effectively for this purpose. A wax base parting agent has been successfully used in the molding of reinforced plastic die boxes as described herein.

After the parting agent has been applied, an initial coating of the plastic binder material is applied over the entire mold area to a thickness of about $1/16''-1/8''$. The purpose of the initial plastic resin coating is to obtain a smooth outer surface on the finished die box. It also prevents the glass fiber reinforcing members from forming any part of the outer surface. This latter condition is undesirable because of the capillary action of typical glass fiber materials.

After the initial coating has at least partially solidified to form a "gel coat," the first layer of reinforcing material, the precut glass fiber member 33, is placed in the mold dry and then is thoroughly wetted with the plastic binder material by daubing with a paint brush or similar tool. Additional glass fiber members 33 are then laid in the mold and are daubed with the plastic binder material until the level has been built up to the top 46 of the member 15. The build up is continued from this point in the same fashion but using the glass fiber members 37 and again daubing each member 37 with plastic binder material until the structure has been built up to the surface 47 of the projection 16.

The washer 36 is then slipped over the threaded end 17 and the glass fiber members 33 are used again in the same way as previously described until the level of the structure is about $1/16''-1/8''$ below the surface 48. Plastic binder material is then poured into the remaining void until its level is slightly above the surface 48. The top plate 49 is then placed over the mold and this forces excess plastic binder material out of the mold to prevent formation of voids in this surface while at the same time forming a resin rich outer surface for the die box. The plate 49 is secured by the nut 50 and the material in the mold is cured at room temperature to a hard integral mass.

When the die box frame has been cured, it is removed from the mold 10 and fitted with inserts. FIGURE 5 shows a finished die box frame 51 having insert openings 52, 53 and 54, 55. The remaining openings are shown with the inserts already molded in place. FIGURES 7 and 8 illustrate an insert 56 which has the general shape of the insert openings 52, 53 and 54, 55 although its outer contour slips into the openings leaving a clearance of about $1/8''$ all around. The insert 56 can be formed from any suitable hard plastic material such, for example, as nylon 101, polyurethane, Delrin and their equivalents. In order to obtain a better bond between the openings 52, 53, etc. and the inserts 56, one or more grooves 57 are formed in the peripheries of the inserts. Likewise, the inner surfaces of the insert openings 52, 53, 54, 55, etc. are roughened.

An insert 56 is then placed in each opening 52, 53, 54, 55 etc. and held approximately centrally of its opening. A plastic binder material, for example, a liquid epoxy resin having a metallic filler such as powdered aluminum, steel, iron, stainless steel or the like, to give it greater strength, is then prepared by admixing the resin with a hardening agent. A powdered aluminum filler has been used with good results. The hardening agent can be a polyamine, polysulfide or polyamide or other material which will cure at room temperature. Good results have been achieved using an aliphatic polyamine hardening agent. The prepared binder is then poured into the space between the inserts 56 and the die box frame openings as shown at 58. The resin is then cured at room temperature. The inner contour 59 of each insert is then finish machined to a size slightly smaller, about .002" all around, than the outer contour of the pressing dies.

The die box frame 51 is then mounted in the soap press and run through its cycle without pressing soap and/or detergent cakes. FIGURE 9 shows the pressing dies 60 entering from opposite sides of a pair of inserts 56 to the pressed position of a soap or detergent cake. The pressing dies are formed of hard metallic materials such as stainless steel or brass and have sharp edges 61 which broach the inner contour 59 of the plastic inserts 56 to an exact fitting shape. This last step eliminates the need for hand-fitting the pressing dies 60 to the inner contour 59 of each insert 56.

FIGURE 10 illustrates an alternate method of positioning the inserts in the openings 52, 53 etc. of the die box frame 51. The mold 10 is transformed into a jig 62 using the same baseplate 11 and frame 13. A plurality of blocks 63 are secured in the same manner as the blocks 26 of the mold. The inserts 64 have the same outer contour as the inserts 56 as will be appreciated by a comparison of FIGURES 8 and 11. However, the inner contour or opening 65 is somewhat larger than the inner contour 59 used in the previously described method. The inserts 64 fit snugly over the outer contour 66 of the blocks 63. After the inserts 64 are placed over the blocks 63 and the die box frame 51 is placed in the frame 13, a plastic binder material, similar to the one previously mentioned, is poured between openings 52, 53 etc. of the die box frame 51 and the inserts 64 to bond the inserts to the die box frame 51. This latter method results in very accurate positioning of the inserts in the die box frame 51 and allows the use of inserts that have an opening 65 only slightly smaller, typically about .002" all around, than the outer contour of the pressing dies. This eliminates the need for machining the inner contour 65 so that final finishing by the pressing dies 60 can be accomplished immediately and without any preliminary machining.

Die boxes formed by the methods described have been found to have a number of advantages. For example, in the event an insert 56 or 64 should become damaged, it is possible to press it out of the die box frame 51 without damaging the frame. The insert can then be replaced in much the same way as already described including broaching by the pressing dies to complete the fitting of the pressing dies to the insert opening. This latter feature is highly advantageous over metallic die boxes which must be scrapped when a single die box opening becomes damaged.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. A method of fabricating a reinforced plastic die box comprising the steps of contact molding the die box frame with insert openings by stacking a plurality of precut glass fiber members in a mold and applying a plastic binder material to each member placed in the mold, curing the die box frame so formed and removing it from the mold, placing plastic inserts in each of the said insert openings and holding the inserts in position, pouring a plastic binder material in the gap between the inserts and the openings and permitting said plastic binder to cure, mounting the die box frame in a soap press, and thereafter finishing the openings in the inserts by running the soap press through its cycle in the absence of soap blanks to force the pressing dies of the soap stamp into the openings from opposite sides of each insert thereby broaching each insert opening to fit the peripheral contour of the pressing dies.

2. A method of fabricating a reinforced plastic die box as claimed in claim 1 including the steps of providing plastic inserts having a central opening which is substantially smaller than the outer periphery of the pressing dies, machining the insert openings to leave only about .002" of material all around for removal by forcing the pressing dies into the insert openings.

3. A method of fabricating a reinforced plastic die box as claimed in claim 1 including the step of holding the inserts in position with relation to the die box frame by fitting them over blocks mounted centrally of the insert openings in the mold.

4. A method of fabricating a reinforced plastic die box comprising the steps of contact molding the die box frame with insert openings by stacking a plurality of precut glass fiber members in a mold and applying an epoxy resin binder material to the members, curing the frame so formed and removing it from the mold, placing plastic inserts in each of the said openings and holding the inserts in position to form a gap between the inserts and the openings in the die box frame, pouring an epoxy resin containing a metallic filler in the gap and permitting it to cure, mounting the die box frame in a soap press, and thereafter finishing the openings in the inserts by running the soap press through its cycle in the absence of soap blanks to force the pressing dies of the soap stamp into the openings from opposite sides of each insert thereby broaching the insert opening to fit the peripheral contour of the pressing dies.

5. A method of fabricating a reinforced plastic die box for a soap stamp comprising the steps of contact molding a die box frame by laying down a plurality of layers of glass fiber material wetted with liquid epoxy resin in an open mold having a plurality of large blocks positioned therein to form openings for receiving die box inserts, thereafter curing the epoxy resin to form a finished die box frame, removing the large blocks and replacing them with smaller blocks to convert the mold to a jig, fitting a die box insert over each smaller block so that the said inserts are properly positioned for final assembly and are surrounded by openings in the die box frame, thereafter pouring liquid epoxy resin having a metallic filler in the space between the die box frame openings and the outside of the inserts whereby the inserts are molded into the frame in proper position when the epoxy resin has cured, mounting the frame in a soap press and finishing the openings in the inserts by running the soap press through its cycle in the absence of soap blanks to force the pressing dies into each opening from opposite sides of each insert thereby broaching the insert openings to fit the pressing die periphery.

References Cited in the file of this patent

UNITED STATES PATENTS

| | | |
|---|---|---|
| 2,915,789 | Dykstra et al. | Dec. 8, 1959 |
| 2,965,946 | Sweet et al. | Dec. 27, 1960 |
| 2,978,529 | Brisley et al. | Apr. 4, 1961 |

OTHER REFERENCES

Modern Plastics, Fabrication of Experimental Low-Pressure Laminates, vol. 21, No. 9, May 1944, pp. 104–106.